United States Patent
Cretch

Patent Number: 6,069,944
Date of Patent: May 30, 2000

[54] SERVICE PROVISION IN A TELECOMMUNICATIONS NETWORK

[75] Inventor: Philip P Cretch, Suffolk, United Kingdom

[73] Assignee: British Telecommunications public limited company, London, United Kingdom

[21] Appl. No.: 08/913,605

[22] PCT Filed: Mar. 22, 1996

[86] PCT No.: PCT/GB96/00703

§ 371 Date: Oct. 29, 1997

§ 102(e) Date: Oct. 29, 1997

[87] PCT Pub. No.: WO96/29830

PCT Pub. Date: Sep. 26, 1996

[30] Foreign Application Priority Data

Mar. 22, 1995 [EP] European Pat. Off. ............ 95301919

[51] Int. Cl.[7] .................................................. H04M 3/42
[52] U.S. Cl. ...................... 379/210; 379/201; 379/207; 379/219
[58] Field of Search .................................. 379/201, 207, 379/210, 219, 220, 221

[56] References Cited

U.S. PATENT DOCUMENTS

| | | | |
|---|---|---|---|
| 4,924,510 | 5/1990 | Le | 379/221 |
| 5,323,452 | 6/1994 | Dickman et al. | 379/201 |
| 5,509,058 | 4/1996 | Sestak et al. | 379/201 |
| 5,546,574 | 8/1996 | Grosskopf et al. | 395/600 |

FOREIGN PATENT DOCUMENTS

| | | |
|---|---|---|
| 0 228 048 | 7/1987 | European Pat. Off. . |
| 0 505 092 | 9/1992 | European Pat. Off. . |
| WO A 93 25035 | 12/1993 | WIPO . |

*Primary Examiner*—Krista Zele
*Assistant Examiner*—Bing Bui
*Attorney, Agent, or Firm*—Nixon & Vanderhye P.C.

[57] ABSTRACT

A telecommunications network of the kind including service control points which permit differing services to be provided to customers centralized storage of date defining service provided to each customer is avoided. Whenever an update of service provided to a particular customer is required, such update is carried out centrally at a service creation point. In the service creation point, data defining the current executable code deployed at the service control point for that customer is recovered to enable recreation of the existing executable code to be carried out. The current code may then be modified regardless of which service creation point is carrying out the modification.

4 Claims, 2 Drawing Sheets

SERVICE PROVISION IN A TELECOMMUNICATIONS NETWORK

BACKGROUND OF THE INVENTION

1. Field of the Invention

The present invention relates to telecommunications networks and in particular to the control of data relating thereto.

2. Related Art

Modern communications networks provide great flexibility to customers. For example, telephone customers have the ability to control the diversion of telephone calls from their own telephone number to any other telephone number on the network.

Similarly, network operators provide flexible services to business customers. Such services as "0800" or "freefone" enable customers to dial a call without being charged (a form of automatic reverse charge calling). The caller is connected by the network to a telephone, the network number of which is derived from the 0800 number.

One procedure for these kinds of service has been to establish a call across the physical network from the calling customer to a network service point (eg to the main switching unit nearest the called customer in the case of call diversion) and then to establish a call across the physical network from the network service point to the diverted network number.

Such procedures waste network resources particularly if two long distance call connections are required to effect a "local" call. This is particularly so if, for example, calls to service numbers are connected in dependence upon the calling customer location.

As network switching speeds improve and the apparent near-instantaneous connection between any two network numbers becomes possible, it is more common for the switching unit to which the calling customer is connected to apply to another point in the network for an actual network number before effecting a call connection. Thus, in the case of call diversion, data-interchange between the originating switching unit and the destination switching unit causes the diversion information to be returned to the originating unit which then establishes a call to the designated network number.

This function becomes more important where number portability or so-called personal numbering is required. Since there is no relationship between any physical connection point in the network and the called number, practically every call requires a translation in the same way as 0800 and similar services currently require.

With translated number services, a service control point provides the destination network number to the originating switching unit. The provided number may be dependent on day of week, time of day or other factors at the called customers discretion. The data held in the service control point is usually under the control of the network operator who effects changes at the request of the customer. However, it may be desirable to allow the customer to effect changes to some of this data.

Similarly, with personal numbering a service control point holds data in respect of one or more nominal physical network codes or numbers. Customers may have the ability to set up time of day/day of week translations and to modify such data from time to time. Alternatively or additionally, the "intelligence" associated with the switching unit may be responsive to customer location data. Finally, the network operator may be required to modify customer related data to restrict or allow certain services to or from specific customers.

As the service provided to and/or selected by the customer now depends upon data held in respect of that customer, as may variations in charges for customer service, it is essential that any data modification carried out by the network operator does not result in unwanted changes to data stored by other authorized persons.

Maintaining a full record of every customer's currently absolute status at each potential service amendment point becomes impractical as the number of such points in the network and the level of flexibility in the network increase.

SUMMARY OF THE INVENTION

According to the present invention there is provided a telecommunications network including a plurality of switching units each controlled by an intelligent control system, at least one service control point adapted to provide a translation from data defining a first telephone number to data defining a second telephone number, and one or more service creation points each capable of acting on data in the service control point(s) to modify translations, wherein prior to effecting any modification of data relating to a specified first telephone number the or each service creation point is arranged to recover existing data from the respective service control centre to permit an exact replica of the current service provided to the defined number to be constructed.

According to a feature of the invention there is provided a method of selectively activating services to customers of a communications network including storing at a service control point respective executable code defining services to be provided for each customer, providing for each customer respective customer-modifiable data to permit the respective customer to determine how defined services are used, and amending the services provided to a respective customer by copying data defining the respective executable code to a remote service creation point, recreating the respective executable code at the service creation point, amending the executable code at the service creation point and deploying the amended code at the service control point.

BRIEF DESCRIPTION OF THE DRAWINGS

A telecommunications network in accordance with the invention using the method of the invention will now be described by way of example only with reference to the accompanying drawings of which.

DETAILED DESCRIPTION OF EXEMPLARY EMBODIMENT

Figure 1:
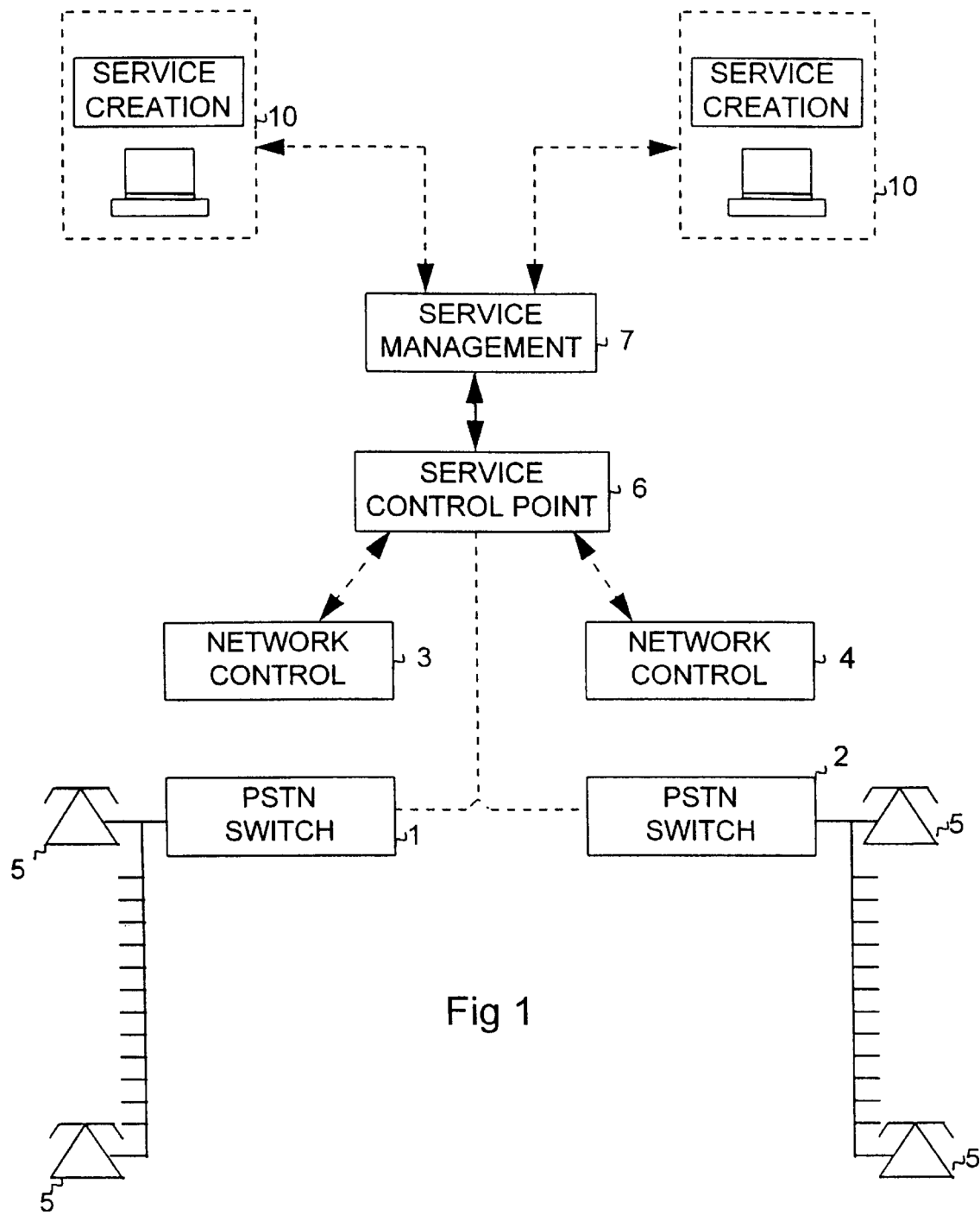
FIG. 1 is a block schematic diagram of an intelligent telecommunications network in which the invention may be used.

Referring first to FIG. 1, the public switched telephone network (PSTN) is represented by two switches 1 and 2 each with its associated intelligent network control 3 and 4.

Each switch serves a number of customer lines 5 each of which has a specific network number which may not necessarily correspond to a customer's telephone number.

Within the network, normally at specific main switching centres, a number of service control points 6 are provided only one of which is shown for simplicity.

The service control points 6 for a particular service code, for example 0800 or 0345, hold translation data in respect of that code. Similarly for specific customers identified by their called numbers, translation data may be held.

Consider a call originating from a customer line 5 on the switch 1. If the customer signals the code 0800 followed by a number defining the service required, the network control 3 will recognise this as a number requiring translation and will forward a query message by way of a network data channel to one of the respective service control points 6 for "0800". The service control point 6 will return a call control message by way of the data channel to the network control 3 to identify the network number of another customer line 5 to which the call is to be completed. This allows the network control 3 to complete the call across the network in known manner.

As described above the service control point 6 appears to be a simple data map. In practice, in combination with service management layers 7 of the network, the function is more complex. Thus the call originated above may be connected to a first network number whereas had the call originated from a customer elsewhere, for example on the switch 2, an alternative network number could have been selected. Further, if the receiving customer wishes, the selection may be time of day dependent. Thus calls received at night may be directed to a cental location while daytime calls are directed to a local franchisee. Additional specifiable changes may include (but not be limited to) weekend connection to different areas, automatic diversion when one server is busy or rotational selection of call recipients.

The network operator will program the service control points 6 and will update the program in respect of particular numbers as and when enhanced or reduced service is to be provided. Changing the service available requires the service management systems 7 to "know" what services are currently available. Now with relatively limited numbers of customers using specialised services it is possible to maintain a record in the management system of the complete build for each individual customer.

However, as network flexibility increases and services to customers such as personal numbering or number portability increase, the relationship between the called number and the network destination becomes more tenuous. Thus, almost every number dialled requires translation and the number of service selection possibilities grows to almost one per customer. The network operator continues to provide overall accessability to services for each customer, for example providing for call diversion to other numbers, responding to customer location data (such as personal numbering cards and telephone instruments), or selectable time of day/day of week diversions or destinations.

As some data is customer dependent, for example the number to divert to, time and day data, mobile numbers and the like, maintaining or modifying customer service records at the service management level 7 could result in inconsistency of the customer's data particularly if customer data changes during service management activity.

Figure 3:
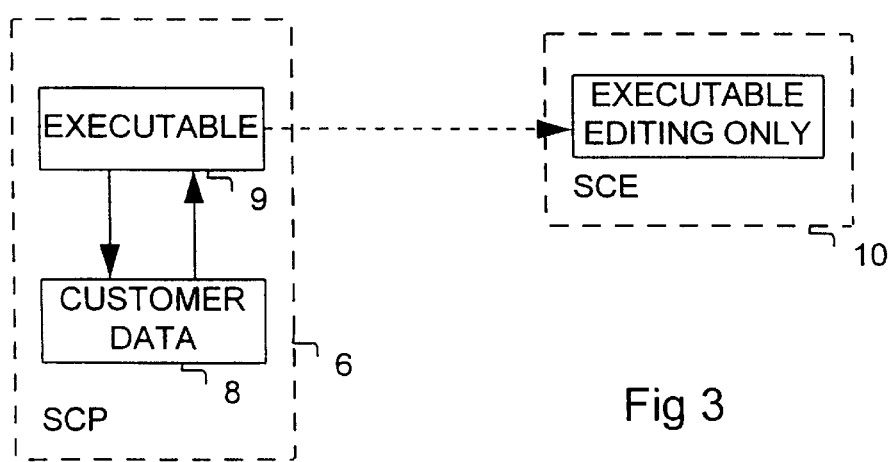

Accordingly, referring also to FIG. 3, within the service control point 6 the customer defined service is separated from service provision. Thus the network operator defines service available to a particular customer by provision of executable program 9 which refers out to customer data 8, or on customer action, modifies customer data 8 if such modification is permitted.

When the network operator is required to define service for individual customers or to amend previously defined service, only the executable program 9 of the information at the service control point 6 needs to be altered. Currently the service defined by the service management layer 7 would require to be amended and that layer would hold details of the services provided to a particular customer. To effect such changes a service creation function 10 is provided.

Figure 2:
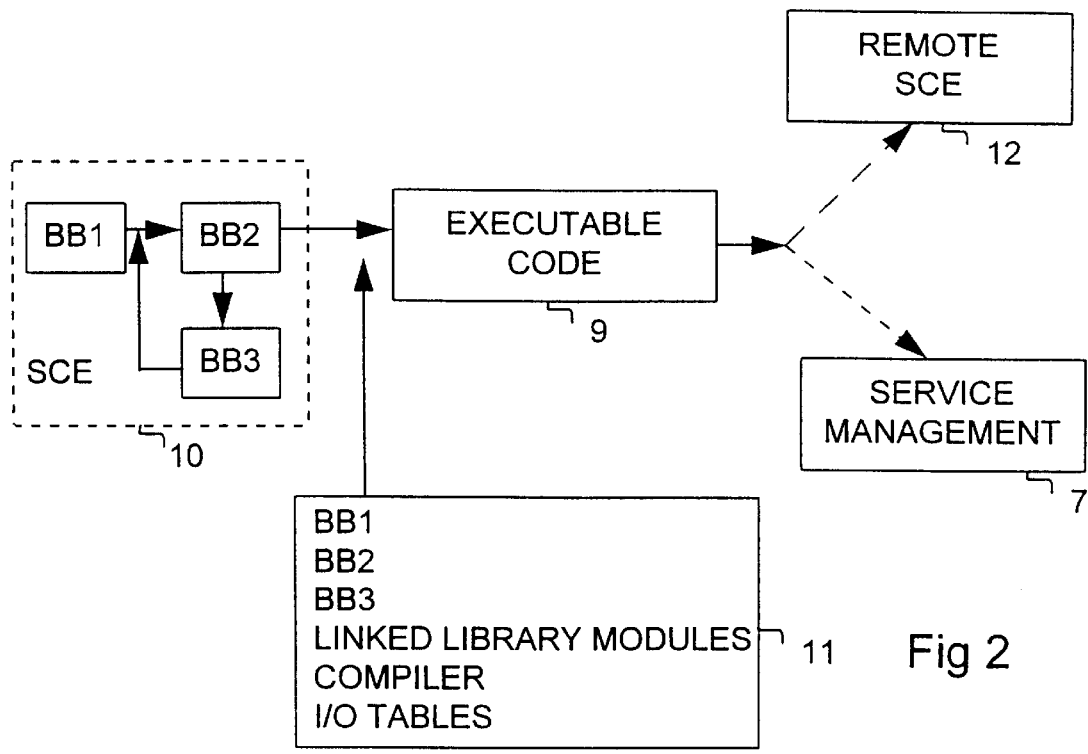
FIGS. 2 and 3 show schematically data and code transfers within the network of FIG. 1 in accordance with the invention.

Referring additionally to FIG. 2, in the service creation environment 10 the operator selects a number of service building blocks represented by BB1, BB2 and BB3, each of which provides a particular service function. Selected blocks are combined with program modules from a library and compiled (11) to provide the executable code 9 for use by the service control point 6. The generated data is deployed by way of the service management layer 7 into the appropriate service control point 6.

As will be appreciated, modification of the executable code 9 requires the service creation environment 10 to know not only what facilities are to be added or cancelled from the customer services but also what services are to remain. Further, modification of service also requires knowledge of the building block (BB1–BB3) versions previously used.

To store all of this data at each service creation environment likely to effect service modification for a particular customer is expensive in terms of data storage and maintaining diverse records in an up-to-date state.

Accordingly, with the present invention, whenever a service amendment is required the service creation environment 10 recovers the existing executable code directly from the service control point 6. Within the executable code 9 is stored dummy instruction information which identifies the build level of the code including the date and library identification information of the building blocks previously used.

Having recovered this information the service creation environment 10 reconstitutes the exact service provided to the customer using only the linked library and module information from the previous (actual) data build. This information may then be used in the creation of a new data build or for examination of the customer service provided.

Thus regardless of the location of the service creation environment, even a remote environment 12 can effect service modification without inadvertently modifying an old version for the particular service.

While as hereinbefore described, the service control points 6 and service creation environments 10, 12 have been described with reference to voice services, it should be realised that the invention is not so limited. Thus as intelligent telecommunications sytsems provide more diverse services, the service creation environment may need to create service combinations involving not only voice and data communications but also services such as telemetry access for third parties, home remote control and monitoring for example.

Growing capability of the PSTN to carry multimedia services, providing the customer with access to hundreds of potential service combinations requires careful handling of service amendments. This invention contributes to the security of customer services.

What is claimed is:

1. A telecommunications network including:

a plurality of switching units, each controlled by an intelligent control system, at least one service control point adapted to provide a translation from data defining a first telephone number to data defining a second telephone number, and one or more service creation points, each capable of acting on data in the service control point(s) to modify translations, wherein, each service creation point includes means arranged to recover existing service defining data from the respective service control point to permit an exact replica of the current service provided to the particular customer to be constructed prior to effecting modification of service relating to a specified customer number.

2. A telecommunications network as in claim 1, wherein:

the service defining data is embedded as dummy instruction information within executable code.

3. A method as in claim 2, wherein;

the data defining the respective executable code is encoded as dummy instructions within the executable code.

4. A method of selectively activating services to customers of a communications network, said method including storing at a service control point respective executable code defining services to be provided for each customer, providing for each customer respective customer-modifiable data to permit the respective customer to determine how defined services are used, and amending the services provided to a respective customer by:

copying data defining the respective executable code to a remote service creation point, recreating the respective executable code at the service creation point, amending the executable code at the service creation point, and deploying the amended code at the service control point.

* * * * *